US009122950B2

(12) United States Patent
Han

(10) Patent No.: US 9,122,950 B2
(45) Date of Patent: Sep. 1, 2015

(54) METHOD AND APPARATUS FOR LEARNING-ENHANCED ATLAS-BASED AUTO-SEGMENTATION

(71) Applicant: IMPAC Medical Systems, Inc., Sunnyvale, CA (US)

(72) Inventor: Xiao Han, Chesterfield, MO (US)

(73) Assignee: IMPAC MEDICAL SYSTEMS, INC., Sunnyvale, CA (US)

( * ) Notice: Subject to any disclaimer, the term of this patent is extended or adjusted under 35 U.S.C. 154(b) by 88 days.

(21) Appl. No.: 13/782,154

(22) Filed: Mar. 1, 2013

(65) Prior Publication Data
US 2014/0247977 A1     Sep. 4, 2014

(51) Int. Cl.
*G06K 9/62* (2006.01)
*G06K 9/34* (2006.01)
*G06T 7/00* (2006.01)

(52) U.S. Cl.
CPC ............... *G06K 9/34* (2013.01); *G06K 9/6292* (2013.01); *G06T 7/0014* (2013.01); *G06T 7/0081* (2013.01); *G06T 7/0083* (2013.01); *G06T 7/0097* (2013.01); *G06T 2207/10081* (2013.01); *G06T 2207/20081* (2013.01); *G06T 2207/20128* (2013.01)

(58) Field of Classification Search
USPC ........................................................ 382/159
See application file for complete search history.

(56) References Cited

PUBLICATIONS

D. Louis Collins et al., Animal+Insect: Improved Cortical Structure Segmentation, Jan. 1, 1999, vol. 1613, pp. 210-223, Springer Berlin Heidelberg, Berlin Heidelberg, XP055117723.*
Antonio crirninisi et al., Regression Forests for Efficient Anatomy Detection and Localization in CT Studies, Sep. 20, 2010, Medical Computer Visions. Recognition Techniques and Applications in Medical Imaging, pp. 106-107, Springer Berlin Heidelberg, Berlin Heidelberg; XP019160100.*
Antonio Criminisi et al., Regression Forests for Efficient Anatomy Detection and Localization in CT Studies, Sep. 20, 2010, Medical Computer Visions. Recognition Techniques and Applications in Medical Imaging, pp. 106-107, Springer Berlin Heidelberg, Berlin Heidelberg; XP019160100.
Lijn et al., Hippocampus segmentation in MR images using atlas registration, voxel classification, and graph cuts, Neuroimage, Academic Press, Dec. 1, 2008, vol. 43, No. 4, pp. 708-720, Orlando, FL, XP025587650.
International Search Report, issued from the European Patent Office for PCT/US2014/015952, dated May 22, 2014, 6 pages.
International Search Report and Written Opinion, issued from the European Patent Office for corresponding Int. Appln. No. PCT/US2014/015952 mailed on Sep. 8, 2014, 15 pages.

* cited by examiner

*Primary Examiner* — Gregory F Cunningham
(74) *Attorney, Agent, or Firm* — Finnegan, Henderson, Farabow, Garrett & Dunner LLP

(57) ABSTRACT

Disclosed herein are techniques for enhancing the accuracy of atlas-based auto-segmentation (ABAS) using an automated structure classifier that was trained using a machine learning algorithm. Also disclosed is a technique for training the automated structure classifier using atlas data applied to the machine learning algorithm.

36 Claims, 10 Drawing Sheets

| Subject | ABAS | ABAS+Learning |
|---|---|---|
| 1 | 0.690 | 0.837 |
| 2 | 0.765 | 0.848 |
| 3 | 0.756 | 0.847 |
| 4 | 0.766 | 0.859 |
| 5 | 0.687 | 0.817 |
| 6 | 0.677 | 0.861 |
| 7 | 0.691 | 0.837 |
| 8 | 0.732 | 0.880 |
| 9 | 0.754 | 0.876 |
| 10 | 0.765 | 0.882 |
| 11 | 0.727 | 0.871 |
| 12 | 0.745 | 0.876 |
| 13 | 0.699 | 0.852 |
| 14 | 0.715 | 0.881 |
| 15 | 0.743 | 0.883 |
| mean | 0.728 | 0.860 |
| std | 0.0319 | 0.0203 |
| median | 0.732 | 0.861 |

Figure 8

METHOD AND APPARATUS FOR LEARNING-ENHANCED ATLAS-BASED AUTO-SEGMENTATION

There is a need in the art for improving the efficiency and accuracy of atlas-based auto-segmentation (ABAS) of images. For example, with respect to medical images, structure contouring or segmentation is extremely important for radiotherapy planning. Although manual contouring by human experts is still the common standard for high quality segmentation in clinics, manual contouring is tedious, time-consuming and suffers from large intra- and inter-rater variability.

Automated segmentation of images such as computed tomography (CT) images has been proven to be a very challenging problem due to image noise and other artifacts, as well as limited image contrast for most soft-tissue structures. In recent years, ABAS techniques have shown promise as a solution. However, the inventor believes that the accuracy of existing ABAS techniques can still be improved upon to render ABAS more useful in practice and more widely accepted.

The basic principle of ABAS is to perform segmentation of a subject image using one or multiple already-segmented images (e.g., from previously treated patients). These already-segmented images together with their annotations (e.g., structure label maps or structure surfaces) are known as atlases. After aligning a new subject image to an atlas image through image matching (also known as image registration), structure labels defined on the atlas can be mapped to the patient image using the computed image transformation, which then produces structure labels for the patient image. The whole process can be fully automated since many automated image registration methods exist. Based on this principle, it can be expected that the accuracy of ABAS heavily depends on the image registration method that is employed. However, regardless of which image registration algorithm is used, the accuracy of ABAS is also dependent on how similar a chosen atlas is comparing to the patient image. Furthermore, while the use of multiple atlases when performing ABAS helps mitigate this effect, the inventor believes that ABAS can be further improved as described herein.

For example, even with multi-atlas ABAS, the segmentation accuracy is still heavily dependent on image registration between each atlas image and the subject image. Furthermore, it should be understood that ABAS (whether multi-atlas ABAS or single-atlas ABAS) is fundamentally different than model-based segmentation, such as the model-based segmentation described by the published PCT patent application WO 2011/110960. With model-based segmentation, training data such as atlas images are registered to each other to develop a model of a structure of interest. This model, which aims to characterize the shape variations of the structure, is then used during the segmentation process while the atlas images are not. Thus, with model-based segmentation, an atlas image is not registered to the subject image. Instead, only the developed shape model is registered to the subject image. By contrast, with ABAS, each atlas image is registered with the subject image, with the segmentation process then operating to map the structure labels from each atlas image to the subject image based on each atlas image-to-subject image registration.

Independent of image registration, segmentation can also be formulated as a classification problem, where the goal is to construct an image classifier that can assign the correct class (structure) label to each point of a given image. Image point classification by itself is also a hard problem, especially if it desired for one classifier to be able to determine the correct label of an arbitrary voxel in a full 3D image. Thus, the inventor discloses various embodiments that combine the strengths of both ABAS and image classification in a hybrid approach.

Toward this end, the inventor discloses an auto-segmentation method comprising: (1) performing ABAS on a plurality of points in a subject image using an atlas image to generate first data representative of a structure in the subject image, (2) applying a plurality of points in the subject image to a learning-enhanced classifier to generate second data representative of the structure in the subject image, and (3) combining the first data with the second data to generate third data representative of the structure in the subject image, wherein the method steps are performed by a processor. In a preferred embodiment, a plurality of atlas images can be used such that the ABAS is multi-atlas ABAS.

The inventor also discloses an auto-segmentation apparatus comprising a processor, wherein the processor is configured to (1) perform ABAS on a plurality of points in a subject image using an atlas image to generate first data representative of a structure in the subject image, (2) apply a plurality of points in the subject image to a learning-enhanced classifier to generate second data representative of the structure in the subject image, and (3) combine the first data with the second data to generate third data representative of the structure in the subject image. Also, as noted above, a plurality of atlas images can be used in a preferred embodiment such that the ABAS is multi-atlas ABAS.

Further still, the inventor discloses a computer program product for auto-segmentation comprising a plurality of instructions that are resident on a non-transitory computer-readable storage medium and executable by a processor to (1) perform ABAS on a plurality of points in a subject image using an atlas image to generate first data representative of a structure in the subject image, (2) apply a plurality of points in the subject image to a learning-enhanced classifier to generate second data representative of the structure in the subject image, and (3) combine the first data with the second data to generate third data representative of the structure in the subject image. Once again, in a preferred embodiment, the ABAS can be multi-atlas ABAS.

According to another aspect, the inventor discloses a training method comprising: (1) for each of a plurality of sets of atlas data, collecting a plurality of training samples from the atlas data, each atlas data set comprising (i) an atlas image, the atlas image comprising a plurality of data points, and (ii) a plurality of structure labels for a plurality of the atlas image data points, and (2) applying the collected training samples to a machine learning algorithm to generate an automated structure classifier, the structure classifier being configured to determine a structure label for each of a plurality of points of a subject image, and wherein the method steps are performed by a processor.

These and other features and advantages of the present invention will be apparent to those having ordinary skill in the art upon review of the teachings in the following description and drawings.

BRIEF DESCRIPTION OF THE DRAWINGS

FIG. 8 depicts a table for rib cage segmentation results using multi-atlas ABAS with and without learning enhancement.

DETAILED DESCRIPTION

Various embodiments will now be described that relate to both training an automated structure classifier using a machine learning algorithm and performing learning-enhanced ABAS on a subject image using one or more atlas images and the automated structure classifier.

It should be understood that the images processed using the techniques described herein can be take any of a number of forms. In various exemplary embodiments, the images can be medical images such as CT images. However, it should be understood that images of different types can be employed. For example, image types such as magnetic resonance (MR) images and ultrasound images could also be processed using the techniques described herein.

Figure 1:
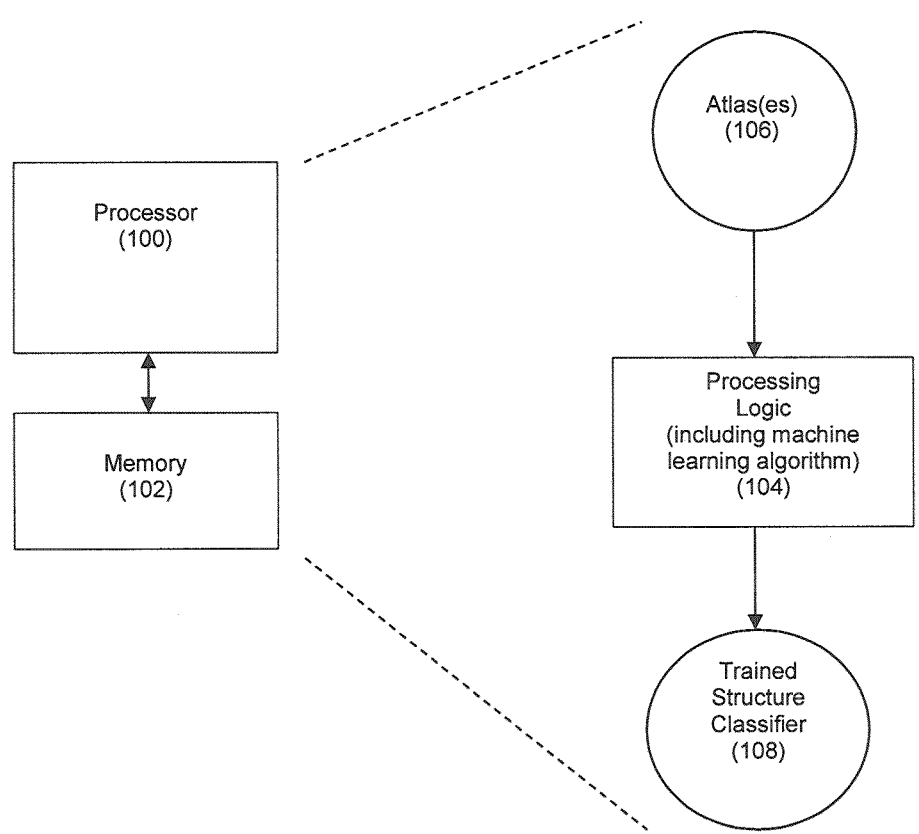
FIG. 1 depicts an exemplary embodiment of the invention for training an automated structure classifier using a machine learning algorithm.

I. Training an Automated Structure Classifier Using Machine Learning:

FIG. 1 depicts an exemplary embodiment for training an automated structure classifier to detect one or more structures of interest within an image. As shown in FIG. 1, a processor 100 can be configured to implement processing logic 104 whereby one or more atlas images 106 are applied to a machine learning algorithm to train an automated structure classifier. The one or more atlas images 106 preferably include structure classification data that identifies the structure of interest in the one or more atlas images 106. The processing logic 104 operates to produce a trained structure classifier 108, where this classifier 108 is configured to process data points of an image to automatically classify whether those points belong to a structure of interest or not. The classifier 108 can take any of a number of forms, such as a set of machine-executable rules. Furthermore, if desired by a practitioner, a trained classifier 108 can be configured to process multiple points of an image in parallel, although this need not be the case.

It should be understood that the atlas images shown by FIG. 1 can be either two-dimensional (2D) images or three-dimensional (3D) images. With a 2D image, the image data points can be referred to as pixels. With a 3D image, the image data points can be referred to as voxels. For the purposes of simplicity, the examples described herein will be for applications to 3D images, in which case the image points are described as voxels. However, it should be understood that the techniques described herein can be equally applied to 2D images for both training a classifier and auto-segmenting an image. Furthermore, for purposes of simplicity, the examples described herein will be described where only one structure is to be classified in an image. However, it should also be understood that the techniques described herein for both training a classifier and for auto-segmenting an image can also be applied to classify multiple structures in a subject image.

The processor 100 can be any processor with sufficient computational capabilities to implement the machine learning features described herein. It should be understood that processor 100 may comprise multiple processors, optionally distributed via a network. The programming instructions for implementing the processing logic 104 can be resident on a non-transitory computer-readable storage medium (e.g., memory 102) for access and execution by the processor 100. It should be understood that the memory 102 may comprise multiple memory devices, optionally multiple distributed memory devices and/or memory devices of different types.

Figure 2:
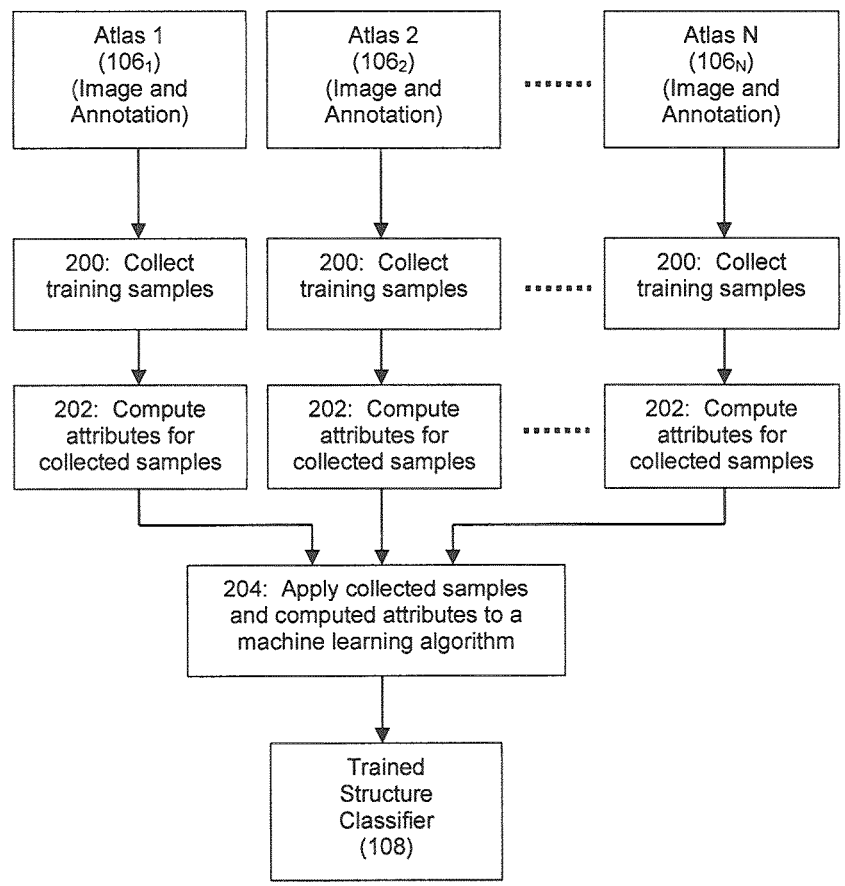
FIG. 2 depicts an exemplary process flow for execution by a processor to train an automated structure classifier using a machine learning algorithm.

FIG. 2 depicts an exemplary process flow for the processing logic 104. The example of FIG. 2 applies a machine learning algorithm to data from multiple atlas images 106 (and their associated classification data) to produce a trained structure classifier that can process a subject image to perform auto-segmentation thereon for the structure of interest. The classification data for the atlas images 106 can be estimates of where the structure of interest is located in the each atlas image 106. This classification data can take any of a number of forms. For example, the classification data can be labels that are associated with voxels of each atlas image 106 to thereby identify whether those atlas image voxels are classified as the structure of interest or not.

The atlas images 106 chosen for the classifier training are preferably atlas images for which there is a high degree of confidence as to the accuracy of their corresponding classification data. Typically, it is expected that manually contoured atlas images 106 will be chosen for application to train the classifier.

At step 200, the processor collects a plurality of sample voxels from the atlas images 106 to use for training the classifier. While it should be understood that the process flow 104 can be configured to operate on all of the voxels of each atlas image 106, the inventor believes that a lesser amount of the atlas image voxels can be employed to improve computational efficiency while still retaining accuracy.

These training samples can be selected as a subset of the atlas image voxels which are within a defined proximity of the structure of interest (as defined by the classification data for each atlas image 106).

Figure 3:
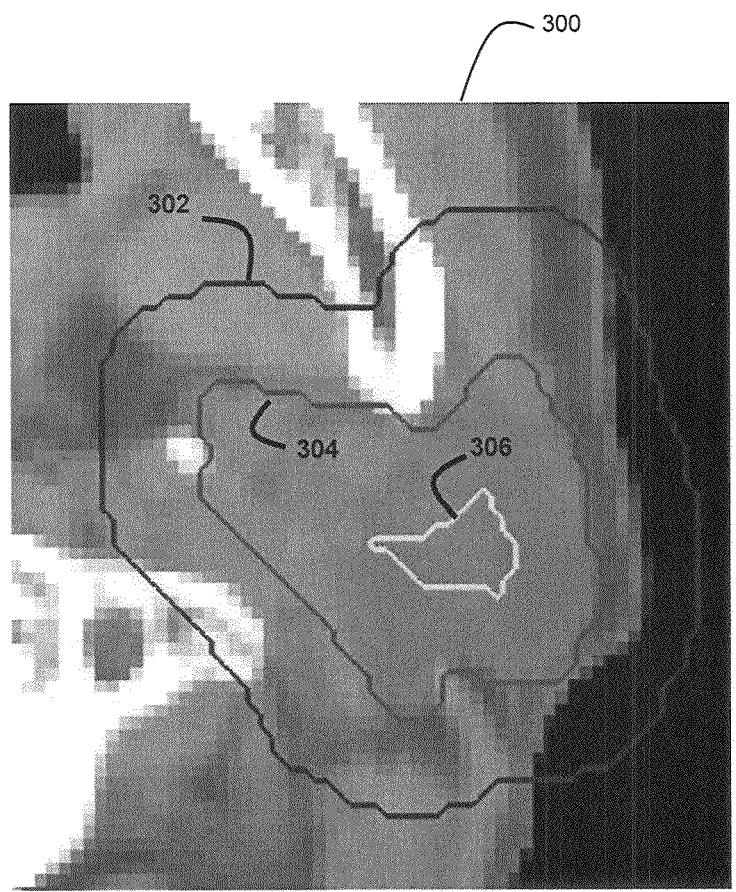
FIG. 3 depicts an example of a sample image region from which to collect samples for training the classifier.

FIG. 3 depicts an example of how training samples can be collected for a single structure. The example of FIG. 3 shows a structure of interest (parotid) on a 2D slice of a 3D atlas image. Contour 304 shows the border of the structure (every voxel inside contour 304 belongs to the parotid, and every voxel outside belongs to "background"). Contours 302 and 306 delineate a region within a certain distance (e.g., 8 mm in this example) to the border of the structure defined by contour 304. This distance can be a parameter for the process flow 104 that can be set by the user. A smaller distance allows the training to be focused on voxels close to the structure border—a region where ABAS segmentation error is most likely to occur. But it is preferred that the distance still be large enough to match a possible error range of ABAS segmentation results. Once the distance threshold is set, step 200 can operate to collect positive training samples for the structure classifier from the set of voxels between contours 304 and 306 (i.e., voxels that are known to belong to the structure of interest). Any voxels between contours 302 and 304 can serve as negative training samples (i.e., voxels that are known to not belong to the structure of interest). It should be understood that while FIG. 3 shows a 2D slice, these principles can be equally applied in 3D space.

Even if one limits the training sample collection to a small neighborhood of a structure between contours 302 and 306, this neighborhood region can easily have tens-of-thousands of voxels for a single image. Because voxels close to each other in the image space are expected to be highly correlated, it is not necessary to use all the voxels between contours 302 and 306 in the training. Using fewer voxels lightens the computational load of process flow 104. Thus, in an exemplary embodiment, step 200 can operate to collect the training samples by taking a certain amount of random samples from all the positive voxels in the training sample candidate set and also a certain amount of random samples from the negative voxels in the training sample candidate set. This random sampling need not be uniform. For example, it is preferred to take more samples closer to the structure border (contour 304) and to take fewer samples further away. Also, most machine learning algorithms prefer that the numbers of positive and negative samples are balanced. Thus, in instances where such a machine learning algorithm is used, step 200 can be configured to take the same amount of positive and negative samples from each atlas for each structure. Suppose that step 200 takes K positive samples and K negative samples from each atlas, and suppose N atlases are employed; in such a situation, the total number of training samples for the learning algorithm would be 2KN. If the classifier in question is meant to be a multi-structure classifier, then step 200 can be configured to collect KN samples for each structure class, and then collect roughly KN samples from their background.

At step 202, the processor computes a plurality of attributes for the collected training samples. These attributes can be used by the machine learning algorithm as part of its classification task. The trained classifier will make decisions about the class label of an image voxel based on measurement data collected at that voxel location. It is believed that voxel classification based solely on the image intensity value of that voxel will suffer from undue inaccuracy because different structures often have very similar intensity values in an image such as a CT image. To build a better voxel classifier, step 202 computes multiple measurements at each voxel location of the training samples in order to get a more complete characterization of the local image appearance and relevant context information. These measurements form the data vector for each image voxel, which can be called the attributes or features of the voxel.

A variety of image features can be computed at each image voxel location. It is expected that the more attributes used to train the classifier, the more accurate the trained classifier will perform; with the tradeoff being that the use of a large number of attributes is expected to result in an increase in computation time. Examples of attributes that can be computed at step 202 for the training voxels can include:

Image intensity value I—either the raw image intensity value or intensity after some pre-processing such as de-noising or intensity normalization.

Image location—the (x, y, z) coordinates of the voxel. The coordinates can be useful if being normalized first with respect to a common reference coordinate system. To achieve this, one can first register every image involved (either the atlas images or a new subject image) to a common template (where any one of the atlases can be chosen as the template) by applying linear image registration, and then recording the voxel coordinates after the linear mapping is applied.

Image gradient $(I_x, I_y, I_z) = \nabla(G_\sigma * I)$ and gradient magnitude $\|\nabla(G_\sigma * I)\|$, where $G_\sigma$ denotes a Gaussian smoothing filter with a kernel size of $\sigma$. Typically, it is beneficial to compute the image gradient features at multiple scales, i.e., multiple $\sigma$ values are applied.

Eigen-values of the image Hessian matrix $H = \nabla^T \nabla(G_\sigma * I)$, which are again computed at different scales.

Image texture measures, such as energy, entropy, contrast, homogeneity, and correlation of local co-occurance matrix as defined in M. Tuceryan and A. K. Jain, "Texture Analysis", *In The Handbook of Pattern Recognition and Computer Vision* (2nd Edition), by C. H. Chen, L. F. Pau, P. S. P. Wang (eds.), pp. 207-248, World Scientific Publishing Co., (1998).

Local image patches of varying sizes. For example, one can directly take the intensity values or normalized values of a local 5×5×5 neighborhood of the voxel to get 125 feature values.

Many features proposed in the computer vision literature can also be used, such as Haar features (see Viola and Jones, "Rapid object detection using a boosted cascade of simple features", Computer Vision and Pattern Recognition, (2001)), HOG (see Dalal, N., Triggs, B., Schmid, C.: Human detection using oriented histograms of flow and appearance. Computer Vision-ECCV, 428-441 (2006)), SIFT (see Lowe, D. G.: Object recognition from local scale-invariant features. *Proceedings of the International Conference on Computer Vision*. 2. pp. 1150-1157 (1999)), Local Binary Pattern (see Ojala, T., Pietikäinen, M., Harwood, D.: A comparative study of texture measures with classification based on feature distributions. Pattern Recognit. 29(1), 51-59 (1996) and Ojala, T., Pietikäinen, M., Mäenpää, T.: Multiresolution gray-scale and rotation invariant texture classification with local binary patterns. IEEE Trans. Pattern Anal. Mach. Intell. 24(7), 971-987 (2002)), and others. These features were mostly proposed for 2D image analysis. As such, if step 202 is being applied to 3D images, these attributes should be extended to 3D or computed in each 2D image slice that contains the voxel under consideration.

It should be understood that step 202 need not compute all of these attributes, and that other attributes could also or alternatively be employed. Furthermore, it should be understood that step 202 can be omitted from the process flow 104 if the atlas image data already includes the attributes for the atlas image voxels that are to be used by the machine learning algorithm.

At step 204, the collected training samples and the computed attributes are applied to a machine learning algorithm to produce the trained structure classifier 108, which as noted below can take the form of a predictor function to automatically classifying a given input voxel of a subject image. The machine learning algorithm can be a supervised learning algorithm. Supervised learning is a branch of machine learning that seeks to infer a prediction model given a set of training data. Each individual sample of the training data is a pair consisting of a data vector (such as the computed attributes and an original voxel data) and a desired output value. The supervised learning algorithm analyzes the training data and produces a predictor function. This predictor function can be called a classifier when the output is discrete (such as a list of structure labels as the exemplary embodiments discussed herein). The predictor function is preferably configured to predict the correct output value for any valid input object, which thus requires the supervised learning algorithm to generalize from the training data to unseen situations in a "reasonable way".

A preferred machine learning algorithm that can be employed at step 204 is the random forests (RF) machine learning algorithm (see Breiman, Leo, "Random Forests", *Machine Learning*, 45 (1): 5-32, 2001, the entire disclosure of which is incorporated herein by reference), which the inventor found to be very robust and accurate for structure classification with respect to medical images.

The RF algorithm operates to produce a trained classifier 108 that is a collection of decision trees. Each decision tree is a set of decision rules organized in a tree-like structure. Each node of the tree applies a decision rule, which is often called a test function or a split function. Each test function takes an attribute or feature value as input and produces a binary (yes/no) output. Based on the yes/no answer, the input data is sent to either the left or the right child-node of the current node. The child node will run another test based on a new feature value. This is repeated until the so-called "leaf-node" is reached. A "leaf-node" is a tree node without "children" nodes. Each leaf-node has a class/structure label associated with it but sometimes it can also be a probability value indicating the likelihood of belonging to a particular class/structure. The rules can be expressed as test functions with binary outputs, e.g.:

$$h(v_i, a_i, b_i) = \begin{cases} 1, & \text{if } a_i \leq v_i \leq b_i \\ 0, & \text{otherwise,} \end{cases}$$

where $v_i$ denotes the i-th feature value, and $a_i, b_i$ are two thresholds. Thus, with a trained classifier 108 that was trained using the RF algorithm, the classifier 108 can take the form of an ensemble of decision trees, where each tree is a set of decision rules organized in a tree or flowchart-like structure, where each internal (non-leaf) node denotes a test on an attribute (i.e., a decision rule), each branch represents an outcome of the test, and each leaf (or terminal) node holds a class label.

During step 204, the trees can be built in parallel if desired since each tree is trained independent of the others. The training samples are used by the RF algorithm to "learn" the tree, i.e., to decide which decision rule to use at each internal tree node. For the RF algorithm, each tree is built using a random subset of the training data such that different trees are highly uncorrelated. Once training samples are collected and their attributes are computed for a tree, the tree is built recursively by adding one node at a time. At each node, the RF algorithm aims to find the best decision rule that most efficiently splits the training data arriving at the current node. In the case of binary classification, "best splitting" means that each branch of the node should contain as many samples from the same class as possible. Thus, the training or learning process with the RF algorithm aims to determine which feature to use at the current node and what threshold values to apply to best split the training data. With the RF algorithm, only a small, random subset of all features are considered at each node, and the "best" feature is selected among this random subset instead of using all features. This randomization again aims to make the trees as independent as possible. Each newly added node splits the incoming (training) data into two branches (two subsets), and each subset will be tested again at the subsequent child node. Thus, each (non-leaf) node can have two children node. The tree continues growing until the training data arriving at each child node all belong to the same class. The child node then becomes a leaf node of the tree, and the class label of the training data arrived at the child node becomes the label of that leaf node.

There are a number of RF algorithm implementations that are publicly-available, for example the Weka machine-learning software package is available online, and it includes an RF algorithm software package. These software packages also include known interfaces through which training samples can be applied to the machine learning algorithm. Moreover, the trained classifier 108 produced by such software packages can take a form such as a text file that expresses the decision tree as machine-executable rules.

The RF algorithm can thus naturally handle multiple classes, i.e., one classifier to classify several structures (plus the background). The output of a RF classifier can be a probability estimation of which class the input data belongs to, which is also preferred over a hard decision as some other learning algorithms would produce. In addition, the RF algorithm is fast in both classifier training and classifier application, and it can deal with very large dimensions of input data.

However, it should be understood that other machine learning algorithms could also be employed at step 204 if desired by a practitioner. Examples of machine learning algorithms that can be employed at step 204 include those described in Witten, I. H., Frank, E., Hall, M. A.: Data Mining: Practical machine learning tools and techniques. Third Edition, Morgan Kaufmann Publishers (2011), the entire disclosure of which is incorporated herein by reference, such as the Support Vector Machine (SVM) or AdaBoost machine learning algorithms.

It should be understood that the process flow of FIG. 2 can be performed "off line" relative to an auto-segmentation operation to be performed on a subject image. That is, the classifier training need only be performed once after the desired atlas images 106 are collected. The resultant trained classifier 108 can then be stored and applied during later use in connection with auto-segmentation of a subject image.

Figure 4:
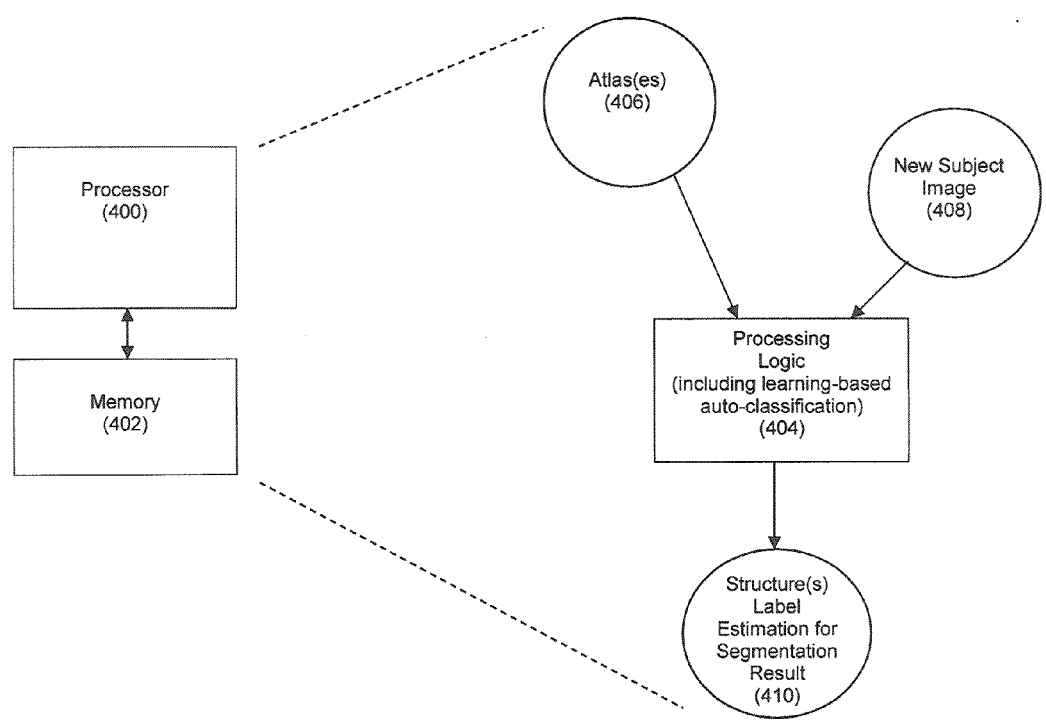
FIG. 4 depicts an exemplary embodiment of the invention for auto-segmenting a subject image using a combination of ABAS and an automated trained structure classifier.

II. Learning-Enhanced ABAS:

FIG. 4 depicts an exemplary embodiment for performing learning-enhanced ABAS that uses a trained classifier 108. As shown in FIG. 4, a processor 400 can be configured to implement processing logic 404 whereby a new subject image 408 is auto-segmented using one or more atlas images 406 to identify one or more structures of interest in the subject image 408. The processing logic 404 operates to generate a segmentation result 410 for the subject image 408, where this segmentation result includes classification data corresponding to estimates of where the one or more structures of interest are located in the subject image 408. This classification data can take any of a number of forms. For example, the classification data can be labels that are associated with points of the subject image to thereby identify whether those subject image points are classified as the structure of interest or not. It should be understood that the images shown by FIG. 4 can be either two-dimensional (2D) images or three-dimensional (3D) images.

The processor 400 can be any processor with sufficient computational capabilities to implement the auto-segmentation features described herein. It should be understood that processor 400 may comprise multiple processors, optionally distributed via a network. The programming instructions for implementing the processing logic 404 can be resident on a non-transitory computer-readable storage medium (e.g., memory 402) for access and execution by the processor 400. It should be understood that the memory 402 may comprise multiple memory devices, optionally multiple distributed memory devices and/or memory devices of different types.

Furthermore, it should be understood that the atlases 406 can be, but need not be, the same atlases 106 used to train the classifier. Moreover, the processor 400 and memory 402 can be the same processor 100 and memory 102 used for training the classifier; but this also need not be the case.

Figure 5:
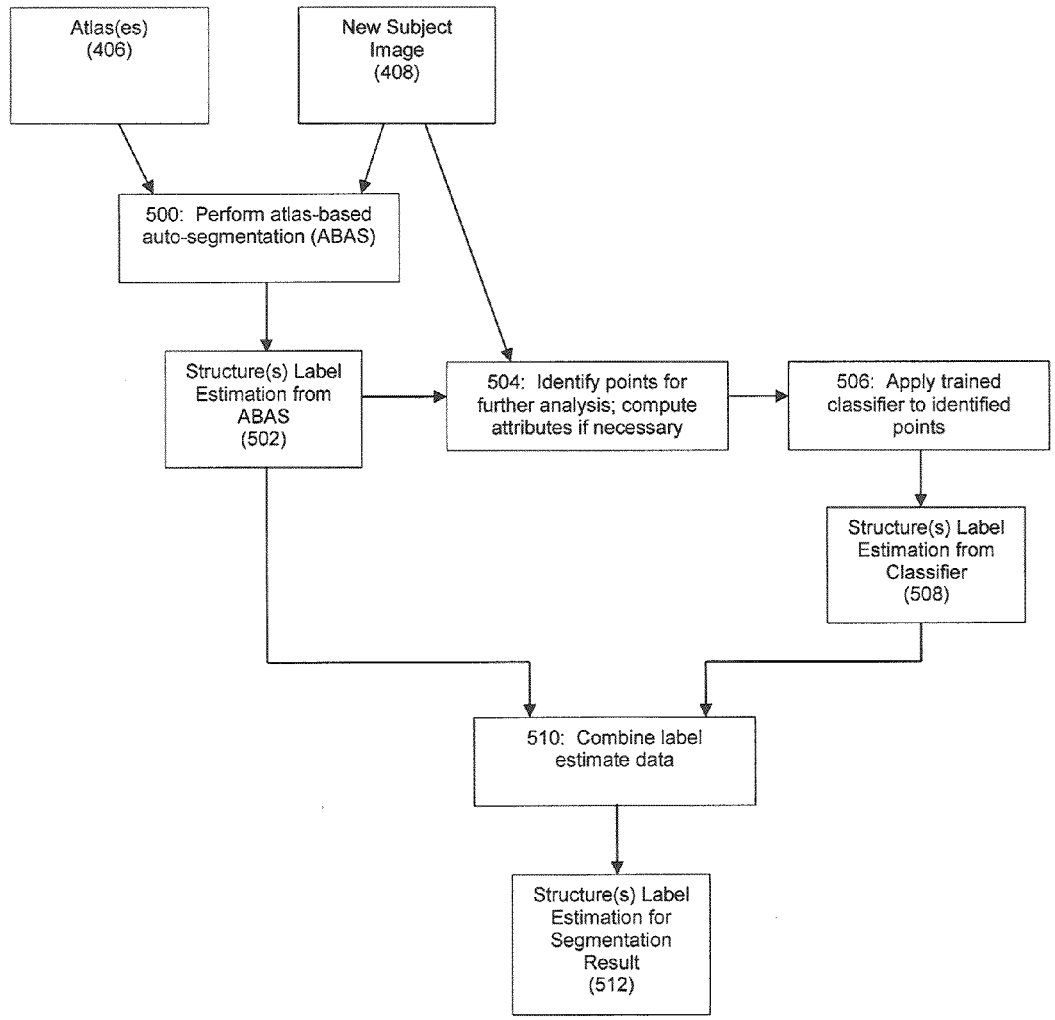
FIG. 5 depicts an exemplary process flow for execution by a processor in accordance with an exemplary embodiment to auto-segment a subject image using a combination of ABAS and an automated trained structure classifier.

FIG. 5 depicts an exemplary process flow for the processing logic 404. The example of FIG. 5 is a hybrid approach that combines the results of both ABAS and auto-segmentation by a trained classifier to generate an overall auto-segmentation result for a subject image 408.

At step 500, the processor performs ABAS on the subject image 408 using one or more atlas images 406. Any known technique for ABAS can be employed at step 500; for example, the ABAS technique described by Han, X., Hoogeman, M. S., Levendag, P. C., Hibbard, L. S., Teguh, D. N., Voet, P., Cowen, A. C., Wolf, T. K.: Atlas-based auto-segmentation of head and neck CT images. In: Metaxas D. et al. (eds.) MICCAI 2008, LNCS 5242, 434-441 (2008), the entire disclosure of which is incorporated herein by reference, can be employed. Step 500 results in the generation of structure label estimates 502. These label estimates can be labels that are associated with points of the subject image 408 to identify whether those subject image points are classified as belonging to the structure(s) of interest or not.

At step 504, the processor uses the ABAS structure label estimates 502 to identify which points of the subject image 408 are to be further analyzed using the trained classifier 108. To improve computational efficiency and reduce the complexity of the trained classifier 108 that is needed, it is preferred that only a subset of the voxels of the subject image 408 be applied to the trained classifier 108. Any of a number of techniques can be used to select this subset of subject image voxels. For example, criteria can be defined for assessing whether the ABAS label for a subject image voxel is ambiguous, and then voxels for which the structure labels are ambiguous can be included in the subset.

As an example of such ambiguity criteria, in instances where data is available that is indicative of the accuracy estimate of the structure label estimates 502, this estimated accuracy data can be used to judge which subject image voxels are to be selected at step 502 (e.g., selecting subject image voxels for which the ABAS structure label is estimated to have an accuracy of X % or below such as 50%). Such voxels can be characterized as ambiguous, and it is believed that the trained classifier can be used to help resolve some of this ambiguity.

As another example of such ambiguity criteria, in instances where multiple atlases were used for the ABAS (where each atlas was registered with the subject image 408 to create a label map, and where these label maps are fused to create the structure label estimate 502), the subset selection can be configured to select ambiguous subject image voxels by identifying the subject image voxels for which there was a disagreement regarding classification among the various label maps used to generate the structure label estimate 502.

As yet another example of such ambiguity criteria, the subset can be selected by defining a proximity around the structure border from the structure label estimates 502, and then selecting the subset as the subject image voxels that lie within this proximity. Given that the most ambiguity (or at least the most material ambiguity) is expected to lie near the structure border, such a technique can help focus the trained classifier on the voxels that are most interest.

These and other techniques can be used to select the subset of subject image voxels to be applied to the trained classifier 108.

Furthermore, if necessary, at step 504, the processor can compute any attributes that are to be used by the trained classifier 108. Thus, step 504 can operate to compute the attributes that were computed at step 202 for the training technique. Thus, the points identified at step 504 can include the computed attributes for such points.

At step 506, the processor applies the points identified at step 504 (including computed attributes) to the trained structure classifier 108. The trained classifier has been trained as discussed above to determine a structure label for a given input voxel based on a plurality of attributes for the input voxel. Thus, the operation of step 506 will result in the creation of classification data 508 for the selected subset of subject image voxels, where this classification data identifies whether each subject image voxel of the selected subset belongs to the structure of interest or not. Once again, this classification data 508 can take the form of a structure label map for the subset of subject image voxels.

Because the trained classifier 108 is not perfect, it is preferred that the final decision for each voxel's structure classification should be based on both the ABAS classification 502 and the trained classifier classification 508. Thus, at step 510, the processor combines the classification data 502 and 508 from ABAS and from the trained classifier 108 to generate final classification data 512 (where this classification data represents the final segmentation result to identify the structure classification labels for the subject image voxels). There are many ways to perform this combination at step 510. For example, majority voting between the classification data 502 and 508 can be employed (although if only one atlas is used for the ABAS structure labeling, a tiebreaking mechanism would need to be implemented). As another example, if the trained classifier 108 produces a hard decision, one can take its result 508 as another label map, and perform a label fusion as between the label maps 502 and 508. For example, if ABAS and the trained classifier 108 provide a probability estimation for its structure labeling (such as when a RF classifier is used), one choice is to compute a final structure probability (P) as a weighted average of the two probability estimations—one from the ABAS label data ($P_L$) and one from the trained classifier label data ($P_C$):

$$P = w_L P_L + w_C P_C, \text{ and } w_L + w_C = 1. \tag{1}$$

The two weights ($w_L$ and $w_C$) can be equal or can be manually or automatically adjusted. The optimal weights may also be automatically determined based on a training procedure such as cross-validation. Once the structure probability is computed for every voxel, the final structure label for classification data 512 can be found by thresholding P at 0.5. As yet another example, the STAPLE method described by Warfield, S. K., Zou, K. H., Wells, W. M.: Simultaneous truth and performance level estimation (STAPLE): An algorithm for the validation of image segmentation. IEEE Transactions on Medical Imaging 23(7), 903-921 (2004), the entire disclosure of which is incorporated herein by reference, can be used to perform the combination operation at step 510.

Because of large anatomical variations that can exist between two arbitrary patients, it is typically difficult to get satisfying segmentation results using ABAS with a single atlas, especially if one atlas is used for all new patients. A common approach to improve segmentation accuracy of ABAS is to use multiple atlases (see Rohlfing, T., Brandt, R., Menzel, R., Maurer, C. R. Jr.: *Evaluation of atlas selection strategies for atlas-based image segmentation with applica-*

*tion to confocal microscopy images of bee brains*. NeuroImage 21(4), 1428-1442 (2004); Rohlfing T., Brandt, R., Menzel, R., Russakoff, D. B., Maurer, C. R. Jr.: Quo Vadis, Atlas-based segmentation? In: Suri, J., Wilson, D., Laxminarayan, S. (eds.) The Handbook of Medical Image Analysis. Kluwer (2005); Heckemann, R. A., Hajnal, J. V., Aljabar, P., Rueckert, D., Hammers, A.: *Automatic anatomical brain MRI segmentation combining label propagation and decision fusion*. NeuroImage 33(1), 115-126 (2006); Klein, S., van der Heide, U. A., Lips, I. M., van Vulpen, M., Staring, M., Pluim, J. P. W.: *Automatic segmentation of the prostate in 3D MR images by atlas matching using localized mutual information*. Med. Phys. 35(4), 1407-1417 (2008); Han, X., Hoogeman, M. S., Levendag, P. C., Hibbard, L. S., Teguh, D. N., Voet, P., Cowen, A. C., Wolf, T. K.: *Atlas-based auto-segmentation of head and neck CT images*. In: Metaxas D. et al. (eds.) MICCAI 2008, LNCS 5242, 434-441 (2008), the entire disclosures of which are incorporated herein by reference.

Figure 6:
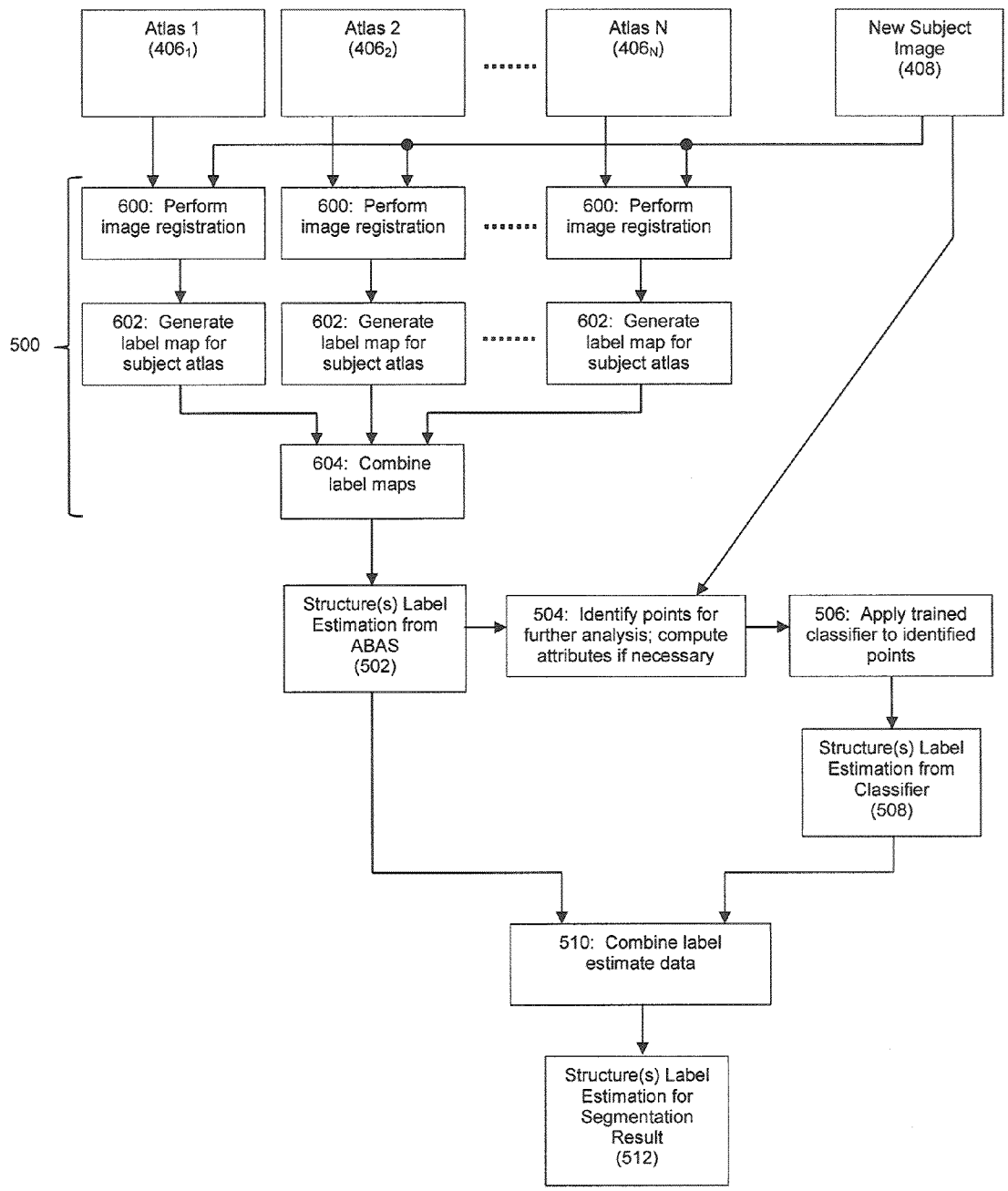
FIG. 6 depicts an exemplary process flow for execution by a processor in accordance with the embodiment of FIG. 5 where multiple atlases are used.

FIG. 6 depicts an exemplary embodiment showing the use of multiple atlases 406 to perform ABAS, and where the ABAS segmentation results are combined with the segmentation results from the trained classifier 108 to generate the final segmentation results 510. With this multi-atlas ABAS strategy, each of the available atlases 406 is first applied (i.e., image registration at step 600 and structure label mapping at step 602) separately to get an independent classification data of the given image for each atlas 406. These multiple segmentation results (label maps) from the different atlases are then combined at step 604 to get a consensus ABAS segmentation for the structure of interest. Step 604 can be referred to as label fusion (similar to step 510). As with step 510, any of a number of label fusion techniques can be employed to combine the individual atlas label maps into the resultant ABAS label map 502. The simplest label fusion approach can be majority voting. With a majority voting label fusion technique, at each voxel of the new image, each atlas label map essentially casts a vote regarding what structure or non-structure ("background") the voxel belongs to. The final label of the voxel can then be determined as the one label that has the most votes. For the binary case where the label value is either 1 (for being inside the structure) or 0 (for being in the background), the majority voting can also be computed by taking the average of all the labels at each voxel and then assigning the voxel to either the structure of the background depending on whether the average is higher or lower than 0.5. Since the average values are between 0 and 1, they can be considered as a probabilistic estimation of the structure label. Majority voting or simple averaging is effective in eliminating random errors in the individual atlas segmentation results. Other more complex label fusion methods can be employed at step 604, such as the STAPLE method noted above. These methods aim to assign optimal, non-equal weights to different atlases based on some intelligent estimation of the performance or accuracy of each individual atlas. Once again, any of these label fusion method can be used at step 604.

Figure 7A:
FIGS. 7(a)-(c) depict examples of images generated through multi-atlas ABAS.
Figure 7B:
Figure 7C:
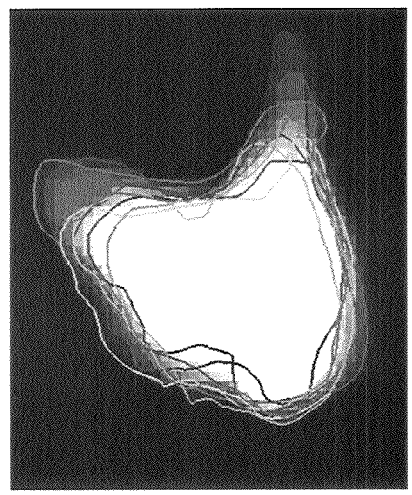

FIGS. 7(a)-(c) depict an example of multi-atlas ABAS segmentation results. FIG. 7(a) shows the estimated structure borders from different atlas label maps (where the structure is a right parotid gland) as contours 700. FIG. 7(b) generally indicates where these different atlas label maps disagree as region 702. FIG. 7(c) shows how the various atlas label maps can be combined to generate a structure probability map via label fusion techniques.

Once the multiple atlas label maps are combined to generate the ABAS classification data 502, the process flow of FIG. 6 can proceed as previously described in connection with FIG. 5.

Several experiments have been performed which indicate that the learning-based enhancement described herein can greatly improve the segmentation accuracy of multi-atlas ABAS. In one study, ABAS and learning-enhanced ABAS was applied to auto-segment the rib cage from lung cancer patient images.

In this experimentation, 15 CT images from 15 different patients were collected. The rib cage in each image was manually segmented by human experts. Leave-one-out cross-validation was ran to test the performance of the FIG. 6 embodiment, where for each patient the remaining 14 datasets were used as the atlases to run multi-atlas ABAS and to train a RF voxel classifier for the ribcage. Two auto-segmentation results were obtained for each patient—one from running multi-atlas ABAS itself with majority voting as the label fusion method, and the second using the learning-enhanced label fusion as described in connection with FIG. 6. For the learning-enhanced label fusion, the final structure probability was computed using equation (1) above with equal weight for the two terms. The accuracy of each auto-segmentation result was evaluated against the given manual segmentation for each patient and measured by the Dice overlapping coefficient, which is the ratio of the volume of the overlapped region between the auto- and the manual-segmentation results to the average volume of the two segmentation results. The results of these experiments are summarized in FIG. 8. As can be seen from the data in the table of FIG. 8, learning-enhanced label fusion greatly improves the segmentation accuracy of the rib cage for multi-atlas ABAS.

Figure 9:
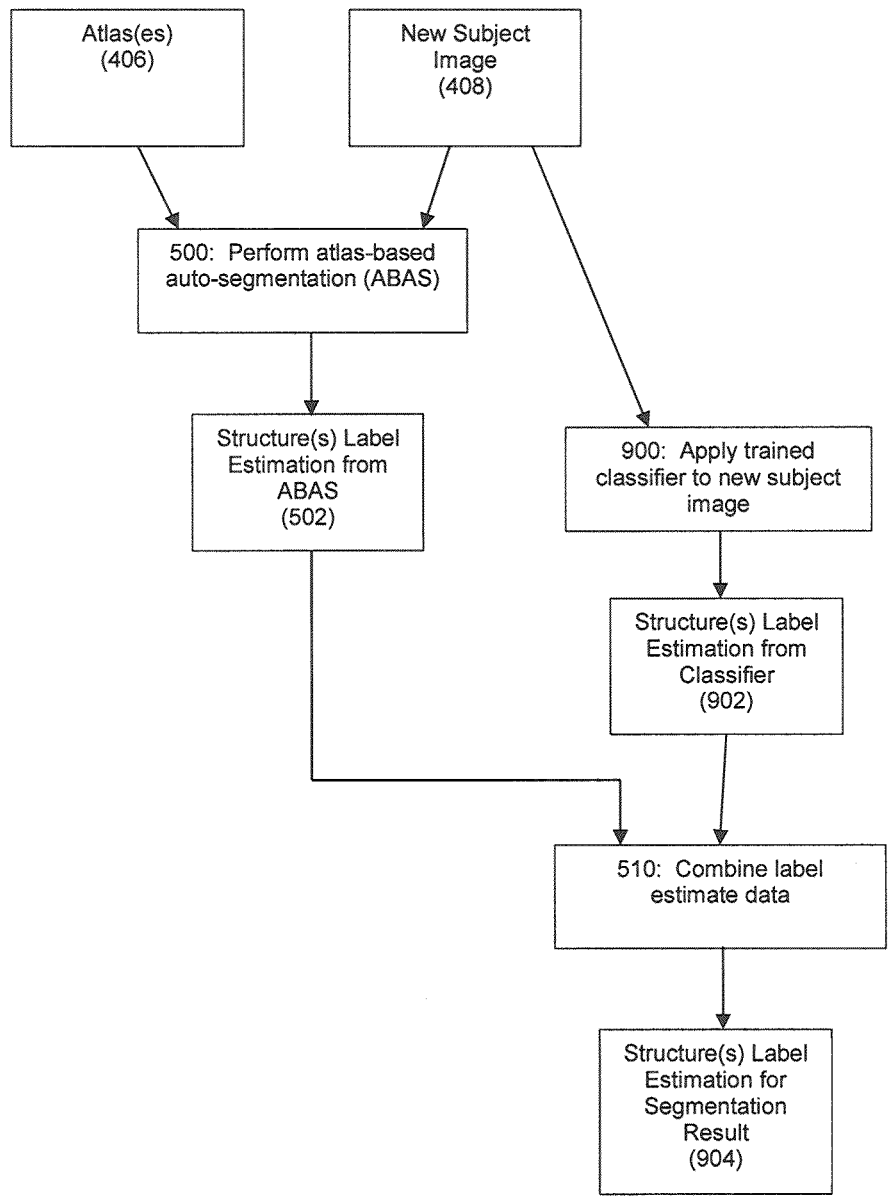
FIG. 9 depicts an exemplary process flow for execution by a processor in accordance with another exemplary embodiment to auto-segment a subject image using a combination of ABAS and an automated trained structure classifier.

While FIGS. 5 and 6 describe exemplary embodiments for performing learning-enhanced ABAS, it should be understood that alternate embodiments can be employed. For example, as indicated above, a practitioner can choose to use the trained classifier to classifier all voxels of a subject image 408, as shown by FIG. 9. Thus, in the embodiment of FIG. 9, step 504 is omitted, and at step 900 the trained classifier 108 operates on all of the voxels of the subject image 408. In such an embodiment, any necessary attributes of the subject image voxels may need to be computed for use by the classifier 108. At step 510, the classification data 502 and 902 is combined as described above to generate the final segmentation results 904.

Figure 10:
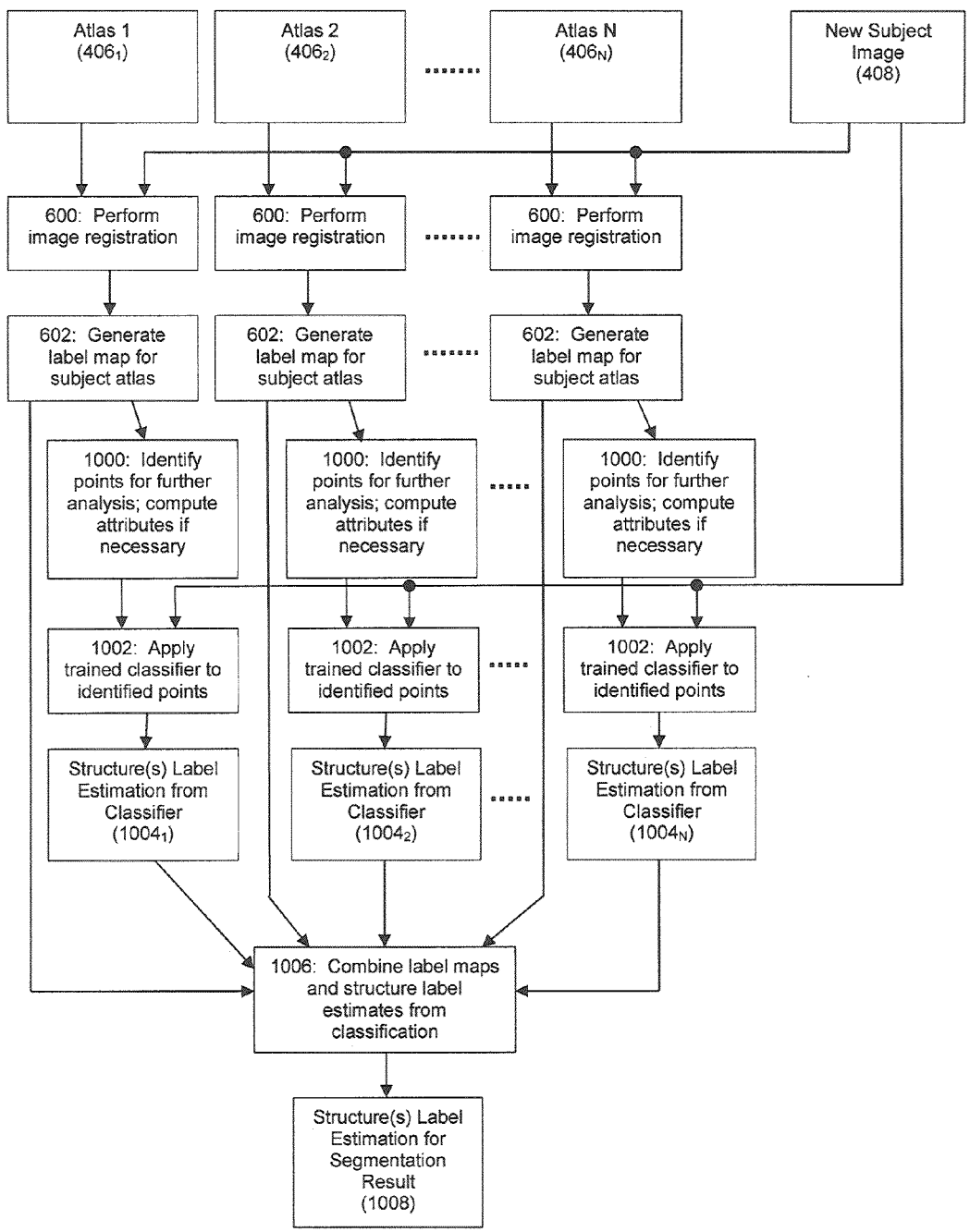
FIG. 10 depicts an exemplary process flow for execution by a processor in accordance with yet another exemplary embodiment to auto-segment a subject image using a combination of ABAS and an automated trained structure classifier.

As another example, in a multi-atlas ABAS embodiment, the trained classifier 108 can be configured to operate independently on subsets of each individual atlas label map generated at steps 602, as shown by FIG. 10. In FIG. 10, step 1000 is performed on each atlas label map generated at step 602. Thus, if an ambiguity criteria is used to select the subsets, step 1000 will results in the ambiguous voxels from each of the atlas label maps being independently applied to the trained classifier 108 at step 1002 to yield different trained classifier label maps 1004 for each atlas. At step 1006, the processor can combine the different ABAS label maps generated at step 602 and the different trained classifier label maps 1004 to yield the final segmentation result 1008. The combination operation at step 1006 can use any of the fusion techniques described above for steps 510 or 604.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. An enhanced auto-segmentation method comprising:
performing, with a processor, atlas-based auto-segmentation on a plurality of points in a subject image using atlas images to generate first data representative of at least one structure in the subject image, wherein performing the atlas-based auto-segmentation includes registering the subject image with the atlas images to map points of the subject image to points of the atlas images;
applying, with the processor, a plurality of points in the subject image to a trained classifier to generate second data representative of the at least one structure in the subject image;
combining, with the processor, the first data with the second data to generate third data representative of the at least one structure in the subject image; and
determining, based on the third data, structure classifications associated with the subject image.

2. The method of claim 1, further comprising:
selecting a subset of the points in the subject image; and
wherein applying the plurality of points in the subject image to the trained classifier comprises limiting the points of the subject image, that are applied to the trained classifier, to the selected subset.

3. The method of claim 2, wherein selecting the subset of the points in the subject image is based on at least one ambiguity criterion with respect to the first data.

4. The method of claim 3, wherein each atlas image comprises a plurality of points, and each atlas image point is associated with a label indicative of whether the associated atlas image point is classified as the at least one structure;
wherein registering the subject image with the plurality of the atlas images associates the registered subject image points with the labels that are associated with the atlas image points that were mapped to the registered subject image points;
wherein generating the first data comprises classifying a plurality of the subject image points as to whether those subject image points belong to the at least one structure based on the labels associated with those subject image points; and
wherein selecting the subset of the points in the subject image comprises selecting the subset of the points as the subject image points that are associated with estimated structure classification accuracy data below a threshold.

5. The method of claim 3, wherein selecting the subset of the points in the subject image comprises selecting the subset of the points based on a proximity of a plurality of the subject image points to a boundary of the at least one structure in the first data.

6. The method of claim 1, wherein the first data comprises a plurality of sets of the first data, and each first data set corresponds to a different one of the atlas images and is representative of the at least one structure in the subject image;
wherein applying the plurality points in the subject image to the trained classifier comprises applying a plurality of points in the subject image for each of the first data sets to the trained classifier to generate the second data as a plurality of second data sets, and each second data set is representative of the at least one structure in the subject image; and
wherein combining the first data with the second data comprises combining the first data sets with the second data sets to generate the third data.

7. The method of claim 1, wherein the trained classifier was trained using a supervised machine learning algorithm applied to atlas data, the atlas data comprises attribute data representative of a plurality of points of a plurality of the atlas images and a plurality of labels associated with the atlas image points, and each label is indicative of whether the label's associated atlas image point belongs to the at least one structure.

8. The method of claim 7, wherein, prior to applying the subject image points to the trained classifier, the trained classifier was trained by applying the atlas data to the supervised machine learning algorithm.

9. The method of claim 8, wherein the supervised machine learning algorithm comprises a random forests machine learning algorithm.

10. The method of claim 8, wherein the trained classifier was trained by defining the atlas data by selecting a subset of the points of the atlas images, and limiting the atlas data to the attribute data representative of the selected subset of atlas image points and the labels associated with the selected subset of the atlas image points.

11. The method of claim 10, wherein selecting the subject of the points in the image comprises defining the subset of the points based on the labels, such that the subset of the points includes a plurality of atlas image points within a defined proximity of a boundary for the at least one structure.

12. The method of claim 1, wherein the trained classifier was trained using a random forests machine learning algorithm, the trained classifier comprises a plurality of decision trees configured to process the applied subject image points, each decision tree is organized as a plurality of branches and a plurality of nodes to implement a plurality of decision rules, the nodes comprise a plurality of internal nodes and a plurality of terminal nodes, each internal node is configured to test an attribute of an applied image point, each branch corresponds to an outcome of the test, and each terminal node holds a structure label for association with an applied subject image point.

13. The method of claim 1, wherein each atlas image comprises a plurality of points, each atlas image point is associated with a label indicative of whether the associated atlas image point is classified as the at least one structure; and
wherein registering the subject image with the plurality of the atlas images associates the registered subject image points with the labels that are associated with the atlas image points that were mapped to the registered subject image points; and
wherein generating the first data comprises combining the labels associated with the registered subject image points according to a label fusion technique.

14. The method of claim 13 wherein the generated first data comprises a plurality of first data labels associated with a plurality of the subject image points, each first data label is indicative whether its associated subject image point belongs to the at least one structure, the generated second data comprises a plurality of second data labels associated with a plurality of the subject image points, and each second data label is indicative whether its associated subject image point belongs to the at least one structure, and
wherein combining the labels associated with the registered subject image points comprises combining, for at least the subject image points for which their associated first data labels and second data labels are in disagreement as to whether the associated subject image points belong to the at least one structure, the associated first data and second data labels according to a label fusion technique.

15. The method of claim 1, further comprising:
computing a plurality of attributes for the plurality of points in the subject image to be applied to the trained classifier; and
wherein applying the plurality of points in the subject image to the trained classifier comprises applying a plurality of points in the subject image and the computed attributes for those points to the trained classifier to generate the second data.

16. The method of claim 15, wherein the attributes comprise at least two members of the group consisting of an image intensity, an image location, an image gradient and gradient magnitude, a plurality of eigen-values of a Hessian matrix for the subject image, an image texture measure, a local image patch, a Haar feature, HOG, SIFT, and a local binary pattern.

17. The method of claim 1, wherein the subject image comprises a computed tomography image.

18. An auto-segmentation apparatus comprising:
a processor configured to:
perform atlas-based auto-segmentation on a plurality of points in a subject image using atlas images to generate first data representative of at least one structure in the subject image, wherein the processor is further configured to perform the atlas-based auto-segmentation by registering the subject image with a plurality of the atlas images to map point of the subject images to points of the atlas images,
apply a plurality of points in the subject image to a trained classifier to generate second data representative of the a least one structure in the subject image,
combine the first data with the second data to generate third data representative of the at least one structure in the subject image, and
determine based on the data structure classification associated with the subject image.

19. The apparatus of claim 18, wherein the processor is further configured to select a subset of the points in the subject image, and limit the points of the subject image that are applied to the trained classifier to the selected subset.

20. The apparatus of claim 19, wherein the processor is further configured to select the subset of the ‚points in the subject image, based on at least one ambiguity criterion with respect to the first data.

21. The apparatus of claim 20, wherein each atlas image comprises a plurality of points, and each atlas image point is associated with a label indicative of whether the associated atlas image point is classified as the at least one structure,
wherein registering the subject image with a plurality of the atlas images associates the registered subject image points with the labels that are associated with the atlas image points that were mapped to the registered subject image points, and
wherein the processor is configured to:
generate the first data by classifying a plurality of the subject image points as to whether those subject image points belong to the at least one structure based on the labels associated with those subject image points, and
select the subset of the points in the subject image as the subject image points that are associated with estimated structure classification accuracy data below a threshold.

22. The apparatus of claim 20, wherein the processor is further configured to select the subset of the points in the subject image based on a proximity of a plurality of the subject image points to a boundary of the at least one structure in the first data.

23. The apparatus of claim 18, wherein the first data comprises a plurality of sets of the first data, and each first data set corresponds to a different one of the atlas images and is representative of the at least one structure in the subject image;
wherein the processor is further configured to apply a plurality of points in the subject image for each of the first data sets to the trained classifier to generate the second data as a plurality of second data sets, and each second data set is representative of the at least one structure in the subject image; and
wherein the processor is further configured to combine the first data sets with the second data sets to generate the third data.

24. The apparatus of claim 18, wherein the trained classifier was trained using a supervised machine learning algorithm applied to atlas data, the atlas data comprises attribute data representative of a plurality of points of a plurality of the atlas images and a plurality of labels associated with the atlas image points, and each label is indicative of whether the label's associated atlas image point belongs to the at least one structure.

25. The apparatus of claim 24, wherein, prior to applying the subject image points to trained classifier the trained classifier was trained by applying the atlas data to the supervised machine learning algorithm.

26. The apparatus of claim 25, wherein the supervised machine learning algorithm comprises a random forests machine learning algorithm.

27. The apparatus of claim 25, wherein the atlas data was defined for the trained classifier by selecting a subset of the points of the atlas images, and limiting the atlas data to the attribute data representative of the selected subset of atlas image points and the labels associated with the selected subset of the atlas image points.

28. The apparatus of claim 27, wherein the processor is further configured to define the subset of the atlas in the atlas image based on the labels, such that the subset of the points includes a plurality of atlas image points within a defined proximity of a boundary for the at least one structure.

29. The apparatus of claim 18, wherein the trained classifier was trained using a random forests machine learning algorithm, the trained classifier comprises a plurality of decision trees configured to process the applied subject image points, each decision tree is organized as a plurality of branches and a plurality of nodes to implement a plurality of decision rules, the nodes comprise a plurality of internal nodes and a plurality of terminal nodes, each internal node is configured to test an attribute of an applied subject image point, each branch corresponds to an outcome of the test, and each terminal node holds a structure label for association with an applied subject it age point.

30. The apparatus of claim 18, wherein each atlas image comprises a plurality of points, each atlas image point being associated with a label indicative of whether the associated atlas image point is classified as the at least one structure,
wherein registering the subject image with a plurality of the atlas images associates the registered subject image points with the labels that are associated with the atlas image points that were mapped to the registered subject image points, and
wherein the processor is further configured to generate the first data by combining the labels associated with the registered subject image points according to a lab&fusion technique.

31. The apparatus of claim 30, wherein the generated first data comprises a plurality of first data labels associated with a plurality of the subject image points, each first data label is indicative whether its associated subject image point belongs to the at least one structure, the generated second data comprises a plurality of second data labels associated with a plurality of the subject image points, and each second data label is indicative whether its associated subject image point belongs to the at least one structure, and wherein the processor is further configured to combine, for at least the subject image points for which their associated first data labels and second data labels are in disagreement as to whether the associated subject image points belong the at least one structure, the associated first data and second data labels according to a label fusion technique.

32. The apparatus of claim 18 wherein the processor is further configured to compute a plurality of attributes for the plurality of points in the subject image to be applied to the trained classifier, and apply a plurality of points in the subject image and the computed attributes for those points to the trained classifier to generate the second data.

33. The apparatus of claim 32 wherein the attributes comprise at least two members of the group consisting of an image intensity, an image location, an image gradient and gradient magnitude, a plurality of eigen-values of a Hessian matrix for the subject image, an image texture measure, a local image patch, a Hear feature, HOG, SIFT, and a local binary pattern.

34. The apparatus of claim 18 wherein the subject image comprises a computed tomography image.

35. A computer program product for enhanced auto-segmentation comprising:
a plurality of instructions that are resident on a non-transitory computer-readable storage medium and executable by a processor to:
perform atlas-based auto-segmentation on a plurality of points in a subject image using atlas images to generate first data representative of at least one structure in the subject image, wherein the plurality of instructions are further executable by a processor to perform the atlas-based auto-segmentation by registering the subject image with a plurality of the atlas image to map points of the subject image to points of the atlas images,
apply a plurality of points in the subject image to a trained classifier to generate second data representative of the at least one structure in the subject image,
combine the first data with the second data to generate third data representative of the at least one structure in the subject image, and
determine, based en the third data, structure classifications associated with the subject image.

36. The computer program product of claim 35, wherein each atlas image comprises a plurality of points, and each atlas image point is associated with a label indicative of whether the associated atlas image point is classified as the at least one structure,
wherein registering the subject image with a plurality of the atlas images associates the registered subject image points with the labels that are associated with the atlas image points that were mapped to the registered subject image points, and
wherein the plurality of instructions are further executable by a processor to:
generate the first data by classifying a plurality of the subject image points as to whether those subject image points belong to the at least one structure based on the labels associated with those subject image points, and
select the subset of the points in the subject image as the subject image points that are associated with estimated structure classification accuracy data below a threshold.

* * * * *

UNITED STATES PATENT AND TRADEMARK OFFICE
CERTIFICATE OF CORRECTION

| | |
|---|---|
| PATENT NO. | : 9,122,950 B2 |
| APPLICATION NO. | : 13/782154 |
| DATED | : September 1, 2015 |
| INVENTOR(S) | : Xiao Han |

Page 1 of 1

It is certified that error appears in the above-identified patent and that said Letters Patent is hereby corrected as shown below:

IN THE CLAIMS

Claim 18, Col. 15, line 34, "determine based" should read as --determine, based--.

Claim 18, col. 15, line 34, "data" should read as --third data--.

Claim 18, col. 15, line 34, "structure" should read as --structure,--.

Claim 20, col. 15, line 41, "the ," should read as --the--.

Claim 20, col. 15, line 42, "image," should read as --image--.

Claim 30, col. 16, line 64, "lab&" should read as --label--.

Claim 33, col. 17, line 26, "Hear" should read as --Haar--.

Claim 35, col. 18, line 13, "based en" should read as --based on--.

Signed and Sealed this
Twelfth Day of January, 2016

Michelle K. Lee
*Director of the United States Patent and Trademark Office*